United States Patent [19]
Mercure

[11] Patent Number: 4,927,032
[45] Date of Patent: May 22, 1990

[54] GLASS RACK

[76] Inventor: Roger Mercure, 399 Principale, Ste. Dorothëe, Laval, Quebec, Canada, H7W 3S6

[21] Appl. No.: 324,764

[22] Filed: Mar. 17, 1989

[30] Foreign Application Priority Data

Sep. 2, 1988 [CA] Canada .................................. 576500

[51] Int. Cl.⁵ .............................................. A47F 7/00
[52] U.S. Cl. .......................................... 211/41; 296/3
[58] Field of Search ........................... 211/4, 49.1, 41;
248/316.2, 316.3, 316.5, 222.1, 231.2, 231.3;
296/3; 410/32–34; 292/207, DIG. 15, 338, 339;
24/498, 513, 515, 517

[56] References Cited

U.S. PATENT DOCUMENTS

| | | |
|---|---|---|
| 531,998 | 1/1895 | Holmes . |
| 2,100,971 | 11/1937 | McDonald . |
| 2,518,624 | 8/1950 | Kraft . |
| 2,887,231 | 5/1959 | Schodorf . |
| 2,908,474 | 10/1959 | Charito . |
| 2,919,811 | 1/1960 | Schodorf, Sr. . |
| 3,412,867 | 11/1968 | Barkon . |
| 4,815,905 | 3/1989 | Garcia, Jr. ................ 410/34 X |

Primary Examiner—Robert W. Gibson, Jr.

[57] ABSTRACT

An improved clamp for use on a glass rack to hold sheets of glass. The clamp has a clamping bar pivotally mounted at one end to one side of the rack. The other end of the bar is cushioned. The bar is movable about its pivot between an upright inoperative position and a sloping operative position where its cushioned end abuts glass sheets on the rack holding them against the other side of the rack.

7 Claims, 2 Drawing Sheets

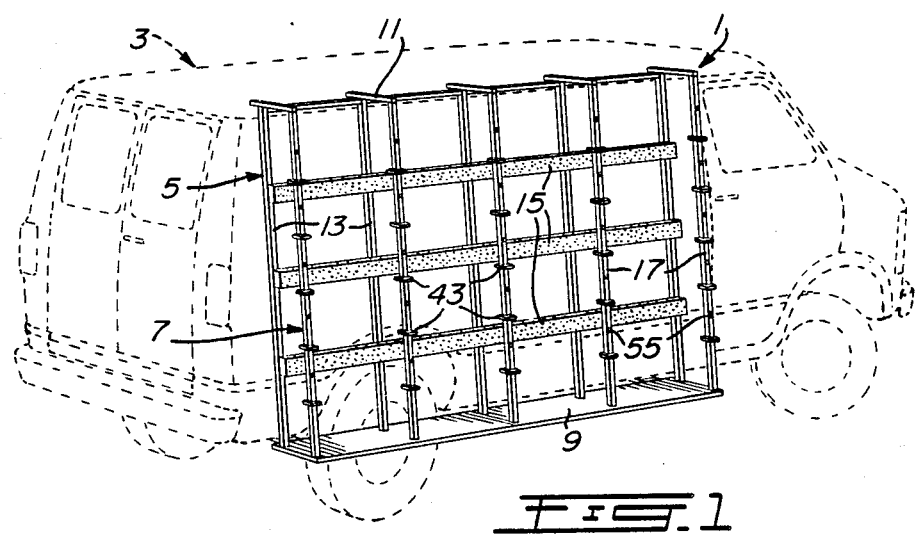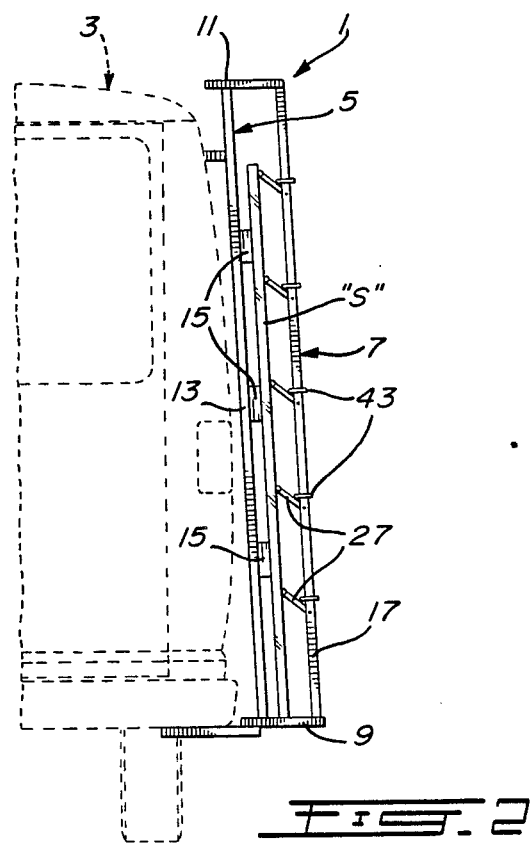

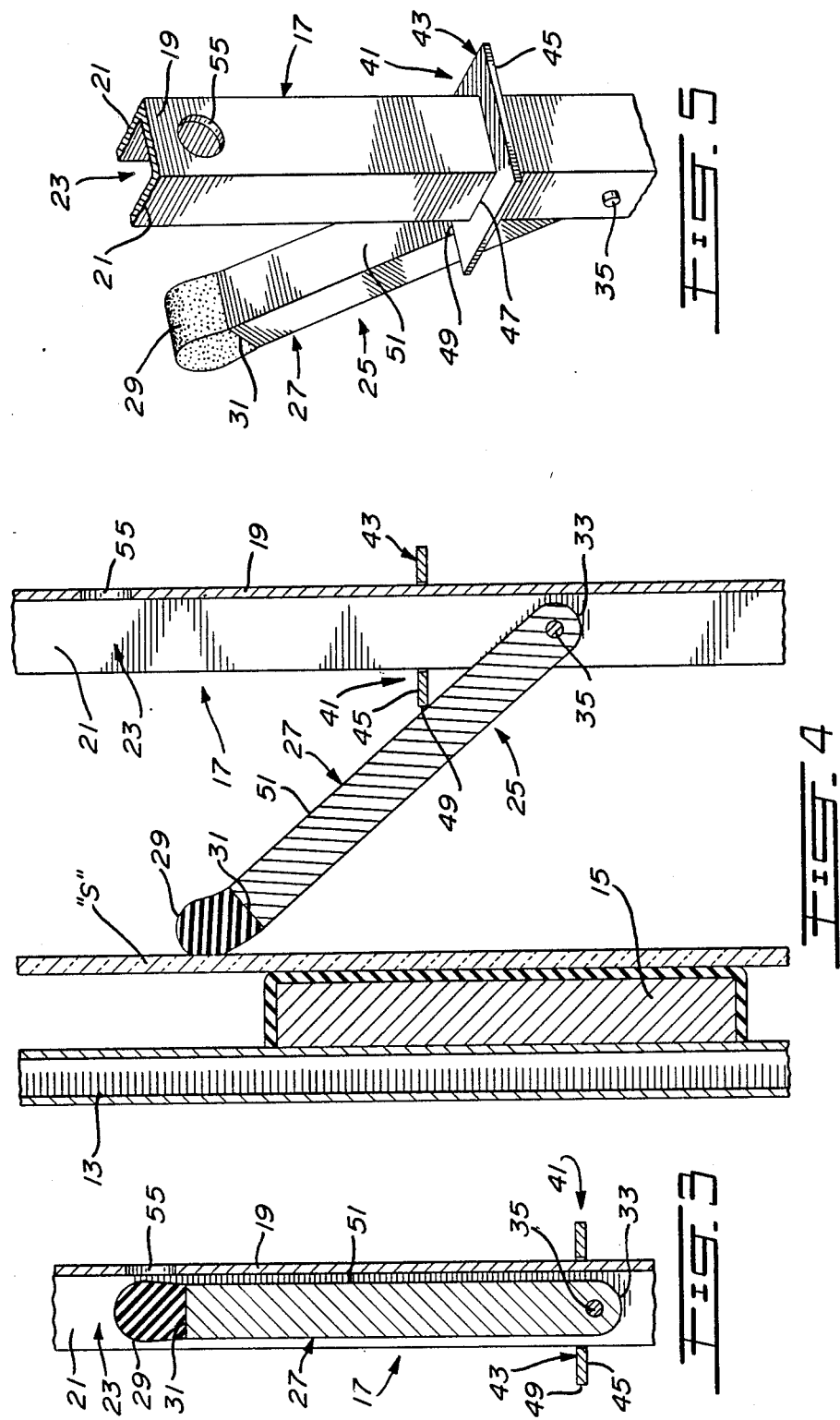

GLASS RACK

BACKGROUND OF THE INVENTION

1. Field of the Invention

This invention is directed toward an improved clamp for holding fragile sheets, particularly glass sheets, in a rack.

The invention is also directed toward a rack for holding fragile sheets which rack incorporates the improved clamps.

2. Description of the Prior Art

Racks for holding and transporting fragile sheets are well known. The racks are often mounted on the sides of vehicles and have a base, on which the sheets to be transported are mounted, and a first, fixed side that is slightly tilted and against which the sheets lean. A second, removable side is mounted on the rack when the sheets are in place. The second side of the rack carries cushioned clamps which can be individually moved toward the first side of the rack to clamp the fragile sheets between them and the first side. Examples of such racks are shown in U.S. Pat. Nos. 2,887,231 and 3,412,867. With the fragile sheets snugly held between the first side of the rack and the clamps, they can be safely transported.

The cushioned clamps are slidably mounted on the second side of the rack. Each clamp is normally mounted via a slot on a pin, which pin is fixed on the second side of the rack. The slot allows the clamp to slide toward or away from the first side of the rack. A lock nut on the pin is used to lock the clamp in place preventing movement of the clamp. The clamps work quite satisfactorily. However it is quite time consuming to have to loosen every nut and slide the clamps to have them press snugly against the sheets and to then tighten the nuts to prevent movement of the clamps.

SUMMARY OF THE INVENTION

It is the purpose of the present invention to provide clamps for holding fragile sheets in a rack which clamps can be more quickly moved between operative and inoperative clamping positions than the known clamps employing a locking nut. The clamps of the present invention allow faster handling of the sheets on and off the rack.

In accordance with the present invention there is provided a clamp having a pivoted clamping bar with a cushioned end. The bar is pivotally mounted at its other end to one side of a rack. The clamping bar can pivot about the pivot means between an upright, inoperative position and a sloping, operative position where its cushioned end abuts sheets resting against the other side of the rack. Holding means on the one side of the rack hold the clamping bar to have its cushioned end snugly clamp the glass sheets against the other side of the rack.

The holding means comprises a collar vertically slidable on the one side of the rack. The collar normally encircles the clamping bar to hold it in its inoperative, upright position. The collar is raised above the clamping bar to allow the bar to be moved to its operative position and the collar is then lowered to bear against the bar to hold it in its operative position.

It will be seen that the clamp is easily operated merely by raising the collar with one hand, pivoting the clamping bar to its operative position and lowering the collar to lock the clamping bar in its operative position. The clamping bar pivots until it contacts the closest glass sheet on the rack. No adjustment of the clamp is needed. A plurality of identical clamps on the one side of the rack are quickly made operative merely by a quick up-down movement of their collars and pivoting of their respective clamping bars.

The one side of the rack comprises removable stakes. The stakes are preferably channel members within which the clamping bars can be stored in their inoperative position. The collars are slidably mounted on the outside of the channel members.

The invention is particularly directed toward a clamp for use in holding sheets snugly in a rack which rack has a first side and a second side and between which sides the sheets are placed. The clamp has a clamping bar with a cushioned end. Pivot means pivotally connect the clamping bar, at a location spaced from its cushioned end, to one of the first and second sides of the rack. The clamping bar is movable about the pivot means between a generally upright, inoperative position and a sloping, operative position where its cushioned end abuts sheets resting against the other side of the rack. Holding means on the one side of the rack, separate from the pivot means, hold the clamping bar in its operative position to have its cushioned end clamp the glass sheets against the other side of the rack.

BRIEF DESCRIPTION OF THE DRAWINGS

FIG. 1 is a perspective view of the rack mounted on a vehicle;

FIG. 2 is an end view of the rack;

FIG. 3 is a cross-section view of a stake in the rack showing the clamp in an inoperative position;

FIG. 4 a cross-section view similar to FIG. 3 showing the clamp in an operative position; and FIG. 5 is a detail perspective view showing the clamp in an operative position.

DESCRIPTION OF THE PREFERRED EMBODIMENTS

The rack 1 is adapted to be mounted on the side of a vehicle 3 such as a van as shown in FIGS. 1 and 2. The rack 1 has two opposed sides 5 and 7. The first side 5 consists of a horizontal bottom shelf 9, a horizontal top member 11 and horizontally spaced-apart vertical posts 13 joining the bottom shelf 9 and top member 11 together. A plurality of vertically spaced-apart horizontal glass support bars 15 are fastened to the vertical posts 13 over the shelf 9. The outer face of each support bar 15 is covered, at least in part, with suitable cushioning material (not shown) to cushion glass sheets "S" lying against the bars. Normally the first side 5 of the rack 1 is mounted on the vehicle 3 with the shelf 9 further away from the vehicle than the top member 11 so that the rack leans slightly. This permits glass sheets mounted on shelf 9 to lean against the support bars 15.

The second side 7 of the rack 1 comprises a plurality of vertical stakes 17. The stakes 17 are adapted to be mounted on the first side 5 of the rack between the bottom shelf 9 and top member 11 and to extend generally parallel to the vertical posts 13 but spaced a short distance therefrom, and from the support bars 15 carried by the posts. The stakes 17 are removably mounted on the first side 5 of the rack. Each stake 17 preferably is channel-shaped when viewed in cross-section having a back wall 19 and side walls 21 as seen in FIGS. 3 to 5. Means, not shown, are provided at each end of the stake for removably mounting the stake on both the bottom shelf 9 and the top member of the first side 5 with the open side 23 of the stake facing the support bars 15.

Each stake 17 carries at least two, and preferably five or six, clamps 25 vertically spaced along its length. Each clamp 25 has a relatively short clamping bar 27 with opposed ends. The bar has cushioning mean 29 mounted at one end 31. Each clamping bar 27 is adapted to be pivotally mounted to its stake 17, adjacent its other end 33, by a pivot pin 35. The pivot pin 35 is fixedly mounted between the side walls 21 of the stake 17. When not in use, each clamping bar 27 is stored upright within its stake 17 with the cushioned end 29 of the bar above the pivot pin 35. When in use, each clamping bar 27 is pivoted toward the first side 5 of the rack about pivot pin 35 to have its cushioned end 29 bear against the glass sheets "S". In this operative position, the clamping bar 27 slopes upwardly from pivot pin 35.

Each clamp 25 also includes holding means 41 to hold the clamping bar 27 in its operative position with its cushioned end 29 bearing against glass sheets "S" stored in the rack to hold them against the support bars 15. The holding means comprises a collar 43 slidably mounted on the stake 17 above the pivot pin 35. The pivot pin 35 prevents the collar 43 from sliding down the stake 17 past its associated clamping bar 27. The collar 43 preferably is in the form of a flat plate 45 having a cutout 47 receiving the stake 17 and a back edge 49 that can bear on the upper surface 51 of the clamping bar 27 when the clamping bar is in its operative position.

Normally, the clamping bar of each clamp 27 is in an upright, inoperative clamping position, stored within the stake 17. The collar 43 of each clamp rests on the pivot pin 35 surrounding the clamping bar 27 and retaining it in place. When fragile sheets such as glass sheets "S" are to be transported, the stakes 17 are removed and the sheets are placed on the bottom shelf 9 of the rack. The sheets lean and lie flush against the support bars 13. The stakes 17 are now replaced. Each clamp 25 is then activated to clamp the sheets in the rack. This is done for each clamp by first sliding collar 43 upwardly on stake 17 above the clamping bar 27 and then pivoting the clamping bar 27 out of the stake 17 about pivot pin 35 to lie against the sheets. To facilitate pivoting of the clamping bar 27, a finger opening 55 is provided in the back wall 19 of the stake 17 above the pivot pin 35. The clamping bar 27 can be easily pushed out of the stake 17 by poking a finger through the opening 55.

The collar 43 is now moved down stake 17 to have its back edge 49 bear against the upper surface 51 of the clamping bar 27 to hold it in place. The collar 43 prevents the clamping bar 27 from moving upwardly thereby holding the glass sheets in place. The collar 43 acts to cam the clamping bar 27 against the sheets.

It will be seen that the clamps 25 are quickly and easily operated by merely sliding the collar 43 up, pushing the bar 27 out, and sliding the collar down. Loading and unloading the sheets is much quicker than when using racks employing lock nuts.

I claim:

1. A rack for snugly holding sheets:
   the rack having two opposed sides for receiving sheets therebetween;
   a plurality of clamps on one of the two sides of the rack for clamping the sheets snugly against the other of the two sides;
   each clamp comprising:
   a clamping bar with opposed ends, one of the ends being cushioned;
   fixed pivot means pivotally connecting the clamping bar at a location spaced from its cushioned end, to the one side of the rack; the clamping bar movable about the pivot means between a generally upright, inoperative position, and an upwardly sloping operative position where its cushioned end abuts sheets resting against the other side of the rack; and
   holding means on the one side of the rack, separate from and movable relative to the pivot means; the holding means holding the clamping bar in its operative position to have its cushioned end clamp the glass sheets against the other side of the rack.

2. A rack as claimed in claim 1 wherein the collar has an edge for gripping the clamping bar to hold the clamping bar against the sheets.

3. A rack as claimed in claim 1 wherein the holding means comprises a collar slidably mounted for vertical movement on the one side of the rack above the pivot means.

4. A rack as claim in claim 3 wherein each collar of each clamp is slidably mounted on the channel member above the pivot means of the clamp.

5. A rack as claimed in claim 4 wherein each clamping bar is sized to fit within its channel member in its upright inoperative position and to be maintained therein by the slidable collar.

6. A rack as claimed in claim 5 wherein the holding means comprises a collar slidably mounted for vertical movement on the one side of the rack above the pivot means.

7. A rack as claimed in claim 5 wherein the one side of the rack is composed of horizontally spaced-apart, generally upright, channel members, the channel members having an open side facing the other opposite side of the rack, the clamping bar of each clamp mounted at its other end within the channel member by the pivot means.

* * * * *